United States Patent
Calvert et al.

(10) Patent No.: US 7,606,691 B2
(45) Date of Patent: Oct. 20, 2009

(54) METHOD FOR LOCALLY CONTROLLING SPATIAL CONTINUITY IN GEOLOGIC MODELS

(75) Inventors: Craig S. Calvert, Houston, TX (US); Tingting Yao, Pearland, TX (US); Glen W. Bishop, Seabrook, TX (US); Yuan Ma, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 591 days.

(21) Appl. No.: 10/303,633

(22) Filed: Nov. 25, 2002

(65) Prior Publication Data

US 2003/0115029 A1 Jun. 19, 2003

Related U.S. Application Data

(60) Provisional application No. 60/341,132, filed on Dec. 13, 2001.

(51) Int. Cl.
| | |
|---|---|
| G06F 17/00 | (2006.01) |
| G06F 17/10 | (2006.01) |
| G06F 17/11 | (2006.01) |
| G06F 17/14 | (2006.01) |
| G06F 7/60 | (2006.01) |
| G01V 1/28 | (2006.01) |
| G01V 1/30 | (2006.01) |
| G01V 1/00 | (2006.01) |
| G01V 1/24 | (2006.01) |
| G01V 1/38 | (2006.01) |
| G01V 1/40 | (2006.01) |

(52) U.S. Cl. .......... 703/10; 703/1; 703/2; 702/14
(58) Field of Classification Search ............ 703/2, 703/1, 10; 702/6, 5, 167, 14
See application file for complete search history.

(56) References Cited

U.S. PATENT DOCUMENTS

| | | | | |
|---|---|---|---|---|
| 4,953,142 | A | 8/1990 | Rimmer | 367/73 |
| 5,691,958 | A * | 11/1997 | Calvert et al. | 367/73 |
| 5,838,634 | A * | 11/1998 | Jones et al. | 367/73 |
| 5,870,691 | A | 2/1999 | Partyka et al. | 702/16 |
| 5,940,778 | A * | 8/1999 | Marfurt et al. | 702/16 |
| 5,982,707 | A | 11/1999 | Abbott | 367/53 |
| 6,049,759 | A * | 4/2000 | Etgen | 702/14 |
| 6,131,071 | A * | 10/2000 | Partyka et al. | 702/16 |
| 6,480,790 | B1 * | 11/2002 | Calvert et al. | 702/14 |

(Continued)

OTHER PUBLICATIONS

Smith, Steven W., The Scientist and Engineer's Guide to Digital Signal Processing, Chapter 10, 2002, 26 pages.*

(Continued)

*Primary Examiner*—Kamini S Shah
*Assistant Examiner*—Suzanne Lo

(57) ABSTRACT

The present invention is a method of generating a geologic model which incorporates a local spatial trend in rock property continuity. Initially, a candidate geologic model is generated by assigning a rock-property value to each block of a model grid. Next, local spectra which characterize the desired local spatial trend in rock property continuity are specified. These local spectra are used to frequency scale the rock-property values of the candidate geologic model. The scaled rock-property values are then combined to generate a scaled geologic model that incorporates the local spatial trend in rock property continuity.

24 Claims, 6 Drawing Sheets

U.S. PATENT DOCUMENTS 7,415,401 B2 * 8/2008 Calvert et al. .................. 703/10
2002/0042702 A1 4/2002 Calvert ......................... 703/10

OTHER PUBLICATIONS

Yao et al. "Spectral Simulation and Conditioning to Local Continuity Trends in Geologic Modeling" Mathematcial Geology, vol. 38, No. 1, Jan. 2006, pp. 51-62.*

Borgman, L., Taheri, M., and Hagan, R. (1984) "Three-Dimensional Frequency-Domain Simulations of Geological Variables," in Geostatistics For Natural Resources Characterization, NATO ASI Series, Reidel Publ., Dordrecht, The Netherlands, pp. 517-541.

Bruguera, J. (1996) "Implementation of the FFT Butterfly With Redundant Arithmetic," IEEE Transaction on Circuits and Systems, Part II: Analog and Digital Signal Processing, v. 43, No. 10, pp. 717-723.

Calvert, C., Bishop, G., May, Y., Yao, T., Foreman, J. Sullivan, K. Dawson, C. and Jones, T., (2000) "Method For Constructing 3-D Geologic Models by Combining Multiple Frequency Passbands," U.S. Appl. No. 09/934,320.

Deutsch, C. And Journel, A. (1997) GSLIB: Geostatistical Software Library and User's Guide, 2nd ed., Oxford University Press, p. 340.

Gutjahr, A. Kallay, P., and Wilson, J. (1987) "Stochastic Models for Two-Phse Flow: A Spectral-Perturbation Approach", EOS, Transaction, American Geophysical Union, v. 68, No. 44, pp. 1266-1267.

Kar, D. (1994), "On the Prime Factor Decompostion Algorithm for the Discrete Sine Transform", IEEE Transactions on Signal Processing, v..42, pp. 3258-3260.

Lam, K. (1995) "Computing the Inverse DFT with the In-Place, In-Order Prime Factor FFT Algorithm", IEEE Transactions on Signal Processing, v. 43, pp. 2193-2194.

McKay, D. (1988) "A Fast Fourier Transform Method for Generation of Random Fields", Unpubl. Master's Thesis, New Mexico Institute of Mining and Technology, p. 92.

Pardo-Iguzquiza, E. and Chica-Olmo, M. (1993) "The Fourier Integral Method: An Efficient Spectral Method for Simulation of Random Fields", Math. Geology, v. 25.

Bracewell, R. N. (1986) *The Fourier Transform and Its Applications*, McGraw-Hill, $2^{nd}$ Ed., pp. 356-381.

Deutsch, C. V. et al. (1998) *GSLIB Geostatistical Software Library and User's Guide*, Oxford University Press, $2^{nd}$ Ed., pp. 3-7, 43-63, 119-122 & 226-231.

Jones, T. A. (1988) "Modeling Geology in Three Dimensions," *Geobyte*, pp. 14-20.

Yao, Tingting (1998) "Conditional Spectral Simulation with Phase Identification," *Mathematical Geology*, v. 30.3, pp. 285-308.

Yao, Tingting (1998) "Automatic Modeling of (Cross) Covariance Tables Using Fast Fourier Transform," *Mathematical Geology*, v. 30.6, pp. 589-615.

Yao, Tingting (1998) "SPECSIM: A FORTRAN-77 Program for Conditional Spectral Simulation in 3-D," *Computers & Geosciences*, v. 24.10, pp. 911-921.

* cited by examiner

| Endmember-local-amplitude spectrum at specified frequency bin number | Endmember-local-amplitude-ratio value for specified frequency bin |
|---|---|
| 310 = Spectrum for base of interval at 4th frequency bin | 1.8 |
| 312 = Spectrum for base of interval at 9th frequency bin | 0.5 |
| 314 = Spectrum for top of interval at 4th frequency bin | 0.7 |
| 316 = Spectrum for top of interval at 9th frequency bin | 1.6 |

METHOD FOR LOCALLY CONTROLLING SPATIAL CONTINUITY IN GEOLOGIC MODELS

This application claims the benefit of U.S. Provisional Application No. 60/341,132 filed on Dec. 13, 2001.

FIELD OF THE INVENTION

This invention relates to the field of geologic modeling. More specifically, this invention relates to a method of building spatial trends in rock property continuity into geologic models to thereby generate models that honor local measures of spatial continuity.

BACKGROUND OF THE INVENTION

Geologic models are commonly used in the petroleum exploration and production industry to characterize petroleum reservoirs and depositional basins. For example, such models, which are computer-based representations of a volume of the subsurface, are frequently used in simulating the performance of a reservoir over time. The term "geologic model" may represent either the entire volume of a subsurface volume of interest to an analyst, or a single region of interest within that larger subsurface volume. Geologic models are generally in the form of a three-dimensional array of blocks, sometimes referred to as cells, or, less commonly, an array of points. Hereafter, without limitation, geologic models will be referred to as being constructed of an array of blocks.

A geologic model's characterization of the subsurface derives from the assigning of geologic rock properties, such as lithology, porosity, acoustic impedance, permeability, and water saturation, to each of the blocks in the model. The process of assigning values to the blocks is generally constrained by stratigraphic or structural surfaces and boundaries, such as facies changes, that separate regions of different geologic and geophysical properties within the subsurface. The importance of the values that are assigned to each of the blocks results from the fact that the spatial continuity of the rock properties in a petroleum reservoir can significantly influence the characteristics of fluid flow from the reservoir. More accurate geologic model characterizations of rock property spatial continuity allow more accurate planning of the production that can be attained from the reservoir. For this reason, methods of improving the accuracy of the characterization of rock property spatial continuity in geologic models are desired.

Industry presently characterizes the three-dimensional spatial continuity of a rock property in a geologic model using geostatistical algorithms. These algorithms use a variogram to quantify the spatial variability of the rock property as a function of both separation distance and direction between individual blocks in the model. The algorithms also assume stationarity in the geologic characteristics of the modeled subsurface region. In other words, geostatistical algorithms assume that a modeled rock property can be represented by a single set of statistical measures, which are often referred to as global measures. For example, a single global variogram model would be used to represent the spatial continuity of the modeled rock property over all blocks of the entire model. A limitation of this method, however, is that it is well known that the geologic characteristics of the subsurface are non-stationary. Specifically, the spatial continuity of a rock property may change locally within the model, sometimes according to predictable or measurable trends. These local changes will be referred to as local measures, and may be characterized by local variogram models.

At present, there are no geostatistical methods available to the industry that allow modeling of continuous spatial trends in rock-property continuity within a modeled region of the subsurface. Examples of properties in which the ability to model such trends would be beneficial include porosity, permeability, and shale volume. The benefit of such an ability would be that if the continuity of spatial trends within the region of the subsurface could be determined, then any such trends could be built into the geologic model. Furthermore, by controlling continuity trends in these properties a model can be developed which more effectively represents subsurface trends in such characteristics as bed thickness, also referred to as vertical continuity, and body dimension, also referred to as lateral continuity. The reservoir performance that is simulated based on the model would then be more likely to be an accurate prediction of the future performance of the reservoir. The present invention provides the geologic modeler with this ability.

SUMMARY

The present invention is a method of generating a geologic model which incorporates a local spatial trend in rock property continuity. Initially, a candidate geologic model is generated by assigning a rock-property value to each block of a model grid. Next, local spectra which characterize the desired local spatial trend in rock property continuity are specified. These local spectra are used to frequency scale the rock-property values of the candidate geologic model. The scaled rock-property values are then combined to generate a scaled geologic model that incorporates the local spatial trend in rock property continuity.

BRIEF DESCRIPTION OF THE DRAWINGS

The features of the present invention will become more apparent from the following description in which reference is made to the drawings appended hereto.

FIG. 3 illustrates the application of an embodiment of the present invention to a geologic model in which a trend in vertical continuity of shale volume is imposed representing a subsurface trend in bed thickness. More specifically.

FIG. 4 illustrates the results of an application of the second embodiment of the present invention for modeling a spatial trend in shale volume continuity. More specifically.

Figure 1:
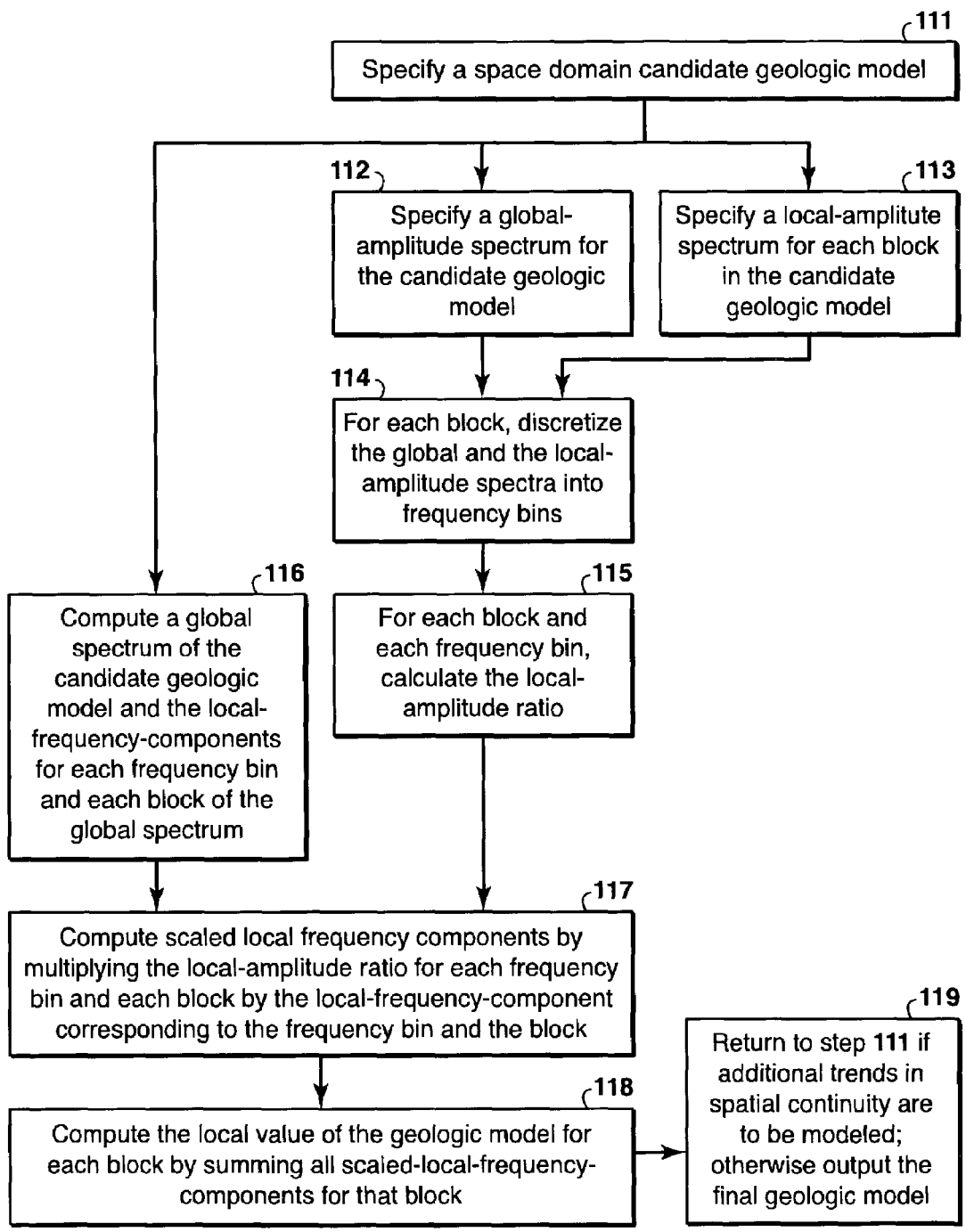
FIG. 1 depicts a flow chart of the steps for implementation of a first embodiment of the present invention.

Changes and modifications in the specifically described embodiments can be carried out without departing from the scope of the invention, which is intended to be limited only by the scope of the appended claims.

DESCRIPTION OF THE INVENTION

This invention is a process to construct geologic models that contain a spatial trend in rock-property continuity within one or more regions in the geologic model. More specifically, this invention allows the modeler to modify the spatial continuity of any subject rock property at any location in a tentative geologic model so that it honors a desired local measure of spatial continuity for that rock property. The rock property must be numerical in value. For clarity, the rock property for which the spatial continuity is to be modeled using the present invention will be referred to as the modeled property.

The method of the present invention begins with the specification of the global characteristics of the modeled property that is intended to be represented by the geologic model. This specification generally involves determining a candidate geologic model and a global variogram of the modeled property for that model. Next, the frequency domain representation of the variation of the modeled property within the geologic model is determined, for example by using a Fourier transform to compute a global spectrum from either the candidate geologic model or the global variogram. In the third step, a local spectrum of the modeled property is determined for each block in the model. This local spectrum provides the mechanism from which local measures of spatial continuity will be incorporated into the geologic model.

The method uses the local spectra to frequency scale the rock property values of the blocks in the candidate model. This characteristic of the present invention provides a mechanism of locally adjusting the global spectrum such that the local spectrum is accurate at each block. One approach for carrying out this frequency scaling involves a frequency bin approach to compute amplitude ratios of the local spectrum to a global spectrum of the candidate geologic model for individual frequency bins for each block. These amplitude ratios provide an indication of the difference in the amount of energy in the frequency bin of the local spectrum at each block as compared to the frequency bin of the global spectrum of the same block, and may be used for the local adjustment of the global spectrum. As further discussed below, the adjustment may be made such that the absolute values of the energy in the local spectrum are preserved, in which case the global spectrum's overall energy may be modified as a result of the application of the present method. In an alternative, the trend represented by the variation of the local spectrum from block to block may be preserved in a manner that preserves the global spectrum's overall energy.

The amplitude ratios may be used to scale local-frequency-components of the candidate geologic model. Local-frequency-components of the candidate geologic model are computed by calculating the frequency domain representation of the candidate geologic model, generally by a Fourier transform, separating this representation into frequency bins, and inverse Fourier transforming each individual frequency bin back into the space domain. Each block then contains one local-frequency-component for each bin. The scaling is performed by multiplying the local-frequency-component for each bin and each block by the amplitude ratio for the bin and the block. Because the amplitude ratios may potentially vary by bin and block, the scaled local-frequency-components may also vary by bin and block. The final step involves summing the scaled local-frequency-components for all frequency bins at each block into a final local space domain value for the modeled property at the block. All calculations are performed on a block-by-block basis, with the result that a geologic model is calculated which honors the desired trend in local spatial continuity of the modeled property.

The steps involved in implementing a first embodiment of the present invention are depicted in FIG. 1, and are further described in the following paragraphs. Note that although the present embodiment is directed at accurately characterizing a single spatial trend in rock-property continuity, in other words a single modeled property, the present invention is not so limited and other embodiments of the invention may be employed for which a multiple number of rock-properties are simultaneously modeled. The following steps of this first embodiment, however, pertain to the process of modifying spatial continuity for a single modeled property.

Initially, a space domain candidate geologic model is assumed (FIG. 1, step 111). This candidate model is generated by assigning at least one rock property value to each block within the model's grid, with the phrase "space domain" referring to the grid orientation in the X-Y-Z physical space of the subsurface region to be modeled. This process will be well known to practitioners of geologic modeling, and can be performed, for example, by using other more simplified geologic modeling schemes, such as geostatistical modeling, and/or by relying on trends present in available measurement data. Preferably, the candidate geologic model should honor all criteria that the model is intended to accurately characterize, with the exception of the desired spatial trend in the modeled property that the modeler desires this embodiment of the present invention to characterize.

Next, a spectrum that best represents a global frequency domain estimate of continuity for the space domain candidate geologic model is generated (FIG. 1, step 112). This spectrum should represent the global estimate of continuity for the modeled property, and may be 1, 2, or 3-dimensional depending on the objectives of the overall analysis. The present method does not require each spectral dimension to represent a specific spatial orientation in the geologic model (in other words not necessarily be oriented along a specific axis—X, Y, or Z— of the space domain model). The spectrum may be generated using any convenient method. For example, the spectrum may be calculated by Fourier transforming the candidate geologic model, or may be assumed based on a desired spectral distribution. Alternately, the spectrum may be computed by Fourier transforming a variogram of the space domain candidate model. As will be understood to those skilled in the art, a spectrum is generally comprised of two components, an amplitude spectrum and a phase spectrum. Hereafter, the amplitude spectrum required for this step 112 of the present embodiment will be referred to as the "global-amplitude spectrum," because it represents, in the frequency domain, an estimate of the amplitude characteristics of the global spatial continuity of the geologic model.

In FIG. 1, step 113, a unique spectrum that represents a desired local initial estimate of the frequency domain characteristics of the modeled property is assigned to each block in the geologic model. This assignment of a unique amplitude spectrum to each block of the geologic model can be accomplished using any convenient method. For example, one might generate several variogram models each representing a different estimate of spatial variability in the modeled rock property. Each block is assigned one of these several variogram models; the variogram model chosen is the one that best represents the desired local estimate of continuity at that block. The variogram models can then be Fourier transformed to the frequency domain. The amplitude spectra which result from this Fourier transform will be referred to as "local-amplitude spectra", and should be of the same dimension (1D, 2D, or 3D) as the global-amplitude spectrum, with each dimension representing the same spatial orientation as the corresponding dimension in the global-amplitude spectrum. These local-amplitude spectra allow the present invention to incorporate local spatial trends in modeled property continuity into the geologic model. All blocks will have local-amplitude spectra, and each such spectra may vary between blocks.

Next, the global-amplitude spectrum and the local-amplitude spectrum are discretized into frequency bins, FIG. 1, step 114. The frequency bins may contain either a single frequency or may cover a range of frequencies, depending on the nature of the model and the analysis that is being carried out. Each frequency bin in the global-amplitude spectrum should be of the same dimension, in other words cover the same frequency or range of frequencies, as the corresponding frequency bin in the local-amplitude spectrum. Analytic efficiency is gained by minimizing the number of frequency bins.

At each block and for each frequency bin, a local-amplitude ratio value is calculated, FIG. 1, step 115, by dividing the amplitude value of the local-amplitude spectrum ($A_{local}$) by the amplitude value of the global-amplitude spectrum ($A_{global}$). If the frequency bin covers a range of frequencies, the local-amplitude ratio can be calculated using any appropriate method. Preferably, a mean square ratio is calculated for frequency bins that cover a range of frequencies, as follows:

$$\text{Local-Amplitude Ratio} = SQRT[\Sigma(A(f)_{local}^2)/\Sigma(A(f)_{global}^2)]$$

where $A(f)_{local}$ represents the amplitude of the local-amplitude spectrum for the frequency range, $A(f)_{global}$ represents the amplitude of the global-amplitude spectrum for the same frequency range, and the summations are over all frequencies "f" in the frequency bin. Thus, at the completion of step 115 in FIG. 1, a local-amplitude ratio is calculated for each frequency bin and for each block of the geologic model.

To apply the local-amplitude ratios to the candidate geologic model, that model must first be decomposed into local-frequency-components in the space domain which correspond to the frequency bins. "Local-frequency-component" means the rock-property information contained within the space domain candidate geologic model for a specified frequency bin. This decomposition can be accomplished, FIG. 1, step 116, by (a) Fourier transforming the candidate geologic model into its amplitude spectrum and phase spectrum (which together comprise the global spectrum of the candidate geologic model), (b) subdividing the amplitude spectrum and the phase spectrum into frequency bins that cover identical frequency ranges as the bins of the local-amplitude spectra, and (c) inverse transforming the spectral content of each frequency bin back into the space domain using the inverse Fourier transform. If the global-amplitude spectrum that was specified in FIG. 1, step 112 was derived from a Fourier transform of the candidate geologic model, substeps (a) and (b) of step 116 for the amplitude spectrum of the global spectrum will have been performed during steps 112 and 114 above. The result of step 116 is that a local-frequency-component is calculated for each frequency bin for each block of the space domain geologic model. A characteristic of the present invention is that these local-frequency-components are scaled to incorporate a desired local trend in rock-property continuity, and the scaled-local-frequency-components described further below thereby incorporate differences from block-to-block which reflect that desired trend.

In FIG. 1, step 117, the local-frequency-component for each frequency bin and each block of the space domain geologic model is multiplied by the local-amplitude-ratio value for that bin and that block. The result of this multiplication is a "scaled-local-frequency-component" for each bin and each block.

In FIG. 1, step 118, the scaled-local-frequency-components are summed over all bins for each block in the candidate geologic model. The result at each block is a space domain representation of the modeled property at that block, and the result is a geologic model that honors the desired local estimates of rock-property continuity for the modeled property. Thus, the process allows a desired trend in spatial continuity of a modeled property to be incorporated into the candidate geologic model.

Finally, the analyst may determine if it is desirable to model other trends in rock-property spatial continuity, FIG. 1, step 119. If not, the model from step 118 is the final product of the present method. Otherwise, the result of step 118 may be treated as a new space domain candidate geologic model to restart the process at step 111. The steps of this embodiment may then be repeated using the values from the new candidate geologic model and new parameters for the same rock property that are intended to represent different trend information for the second application of the sequence of steps in this embodiment of the present invention. For example, if the original candidate geologic model of a specific rock property was modified to represent a trend in spatial continuity of a specified orientation, for example in the Z-axis orientation, this modified model would become a new candidate geologic model and the process described in this embodiment could be repeated to modify this model to represent a second trend in spatial continuity for this same rock property, for example in the Y-axis orientation.

Note that the procedure described above does not ensure that the resulting space domain geologic model will honor all desired characteristics of the initial space domain candidate geologic model. In other words, the desired global spectrum and the desired global rock property composition may be altered as a result of the application of the present method to the candidate geologic model. It may be difficult to both preserve the exact global characteristics of the modeled property that are inherent to the model that is specified in step 111 and at the same time incorporate the local spatial continuity variations that are desired. A number of options are available to address this issue. A first option is to accept the geologic model resulting from the steps described above and which incorporates the desired trends in local spatial continuity but thereby does not necessarily preserve the global characteristics of the candidate geologic model. A second option is to integrate the local-amplitude ratios calculated in step 115 over the entire model and normalize those local-amplitude ratios so as to preserve the candidate geologic model's global characteristics. This could be done by adjusting the local-amplitude ratio values in each frequency bin so that the sum of all values within each bin over all blocks in the model equals unity (1.0). This second option results in a model which preserves the global characteristic of continuity inherent to the candidate geologic model, and at the same time preserves the trends, although not the exact amplitudes, of the local spatial continuity. A third option is to implement the above steps into an optimization procedure for constructing the geologic model. A number of optimization procedure options will be known to those skilled in the art, though preferably the optimization procedure selected should be designed so that all criteria can be maximally honored.

Figure 2:
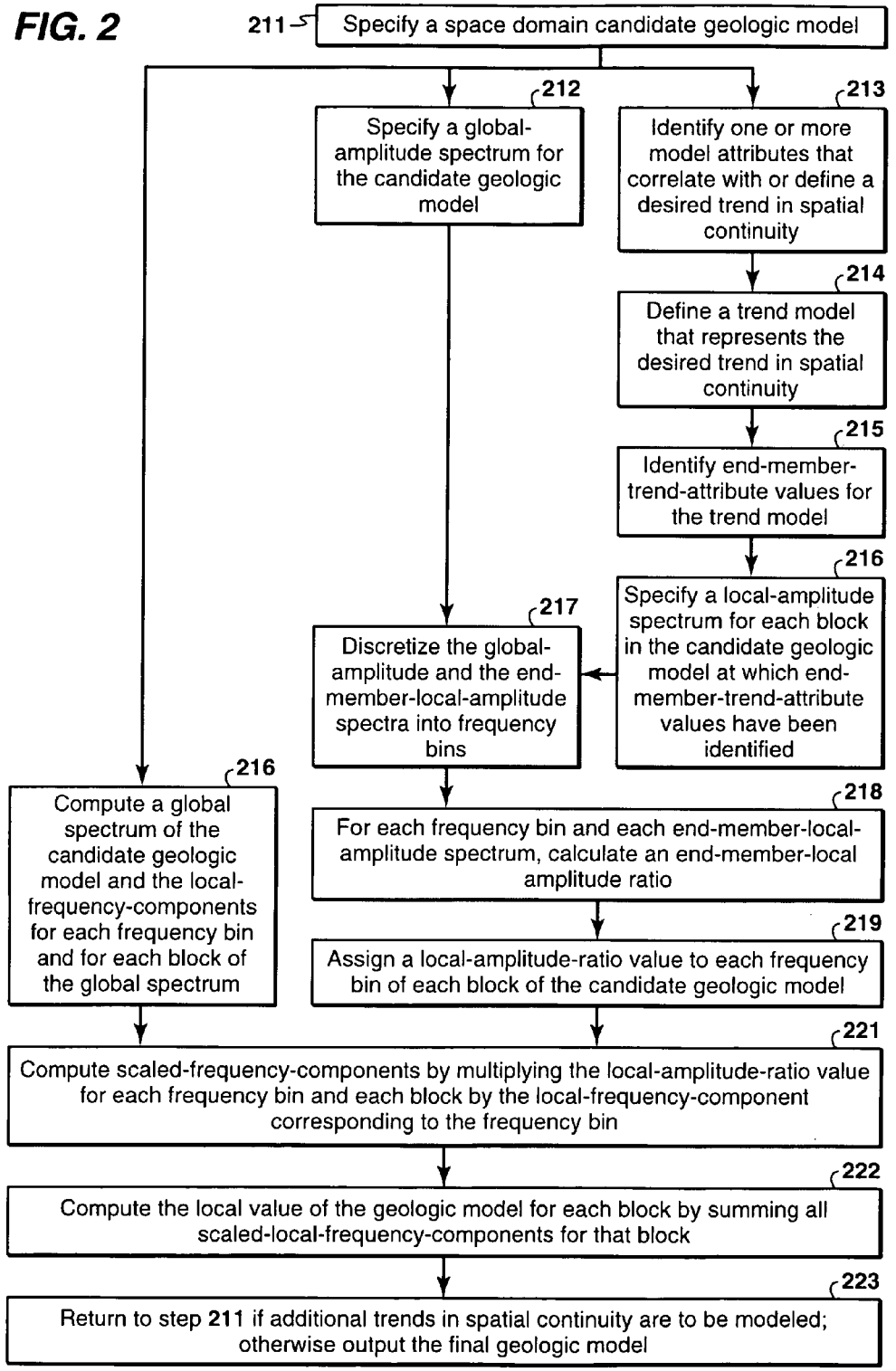
FIG. 2 depicts a flow chart of the steps for implementation of a second embodiment of the present invention.

FIG. 2 depicts a second embodiment of the present invention. This embodiment allows the incorporation of trend models in rock property continuity to be incorporated into the geologic model.

This embodiment also begins with the generation of a space domain, candidate geologic model, FIG. 2, step 211. This involves assigning at least one rock-property value to each block within the candidate geologic model and is identical to step 111 in the embodiment of FIG. 1. Preferably, the candidate geologic model should honor all desired criteria with the exception of the desired spatial trend in rock-property continuity, which again will be referred to as the modeled property. The following steps will all pertain to the process of modifying spatial continuity for a single, modeled property, though the present embodiment is not so limited.

Next, FIG. 2, step 212, a one-dimensional spectrum that represents the global estimate of rock-property continuity for a specific spatial orientation in the space domain candidate geologic model is generated. The spatial orientation in the space domain is the orientation of spatial continuity within the candidate geologic model for which a local variation in rock property continuity is desired. Preferably, the spatial orientation that is chosen will be one of the three orientations—X, Y, or Z— that define the three-dimensional array of blocks that comprise the geologic model. For example, it may be desired to model vertical continuity of the modeled property in the Z-axis direction (in other words, in the vertical direction). In such a case, a one-dimensional spectrum will be generated for the Z-axis. This spectrum may be generated using any convenient method. For example, a variogram model that represents the space domain global estimate of rock-property spatial continuity along the specified orientation may be calculated using methods that will be known to those skilled in the art, and that variogram used to compute a spectrum via a Fourier transform. Alternatively, the Fourier transform may be used to calculate the spectrum directly from either the candidate geologic model or from a sample image that contains the desired global spatial structure in the subject spatial orientation. As discussed above in conjunction with FIG. 1, this amplitude spectrum will be referred to hereafter as the "global-amplitude spectrum."

In the next step, FIG. 2, step 213, one or more geologic model attributes that correlate with or define the desired trend in spatial continuity for the specified spatial orientation in the geologic model are identified. For example, spatial continuity might trend as a function of location within the geologic model, reservoir-interval depth or thickness, rock-facies type, or another assigned or modeled attribute. Hereafter, these attributes will be referred to as "trend-attributes." Depending on the nature of the geologic model and the subsurface structure that the model is intended to characterize, it may be necessary to identify multiple trend-attributes. For example, continuity in the Z-axis direction (vertical continuity) might vary in the geologic model as a function of both rock-facies and the vertical location of the block within the model interval. In a second example, vertical continuity might vary in the geologic model as a function of both the vertical and the lateral location of the block in the geologic model interval. To simplify the discussion of this embodiment of the present invention, the discussion of the remaining steps of FIG. 2 will only consider a single trend-attribute. The extension of this embodiment to include multiple trend-attributes may be accomplished in various ways. For example, the trend model that is defined could be represented as a multivariate function, or the procedure defined in this embodiment could be performed sequentially multiple times with each time focusing on a different trend-attribute.

In the next step, FIG. 2, step 214, a numeric or qualitative model that describes the trend-attribute's variation in spatial continuity throughout the geologic model is specified. This model will be referred to as the trend model. Generally speaking, there are two classes of trend models, continuous and discrete. A continuous trend model would apply when the trend-attribute has continuous values. For example, spatial continuity may trend according to a function of location within a modeled reservoir interval. The function that describes the continuous trend model may be linear or may be a more complex mathematical function. If the trend-attribute has discrete values, for example discrete rock-facies values, then a discrete trend model would be defined. In such a case the spatial continuity in the geologic model of the trend-attribute will simply vary according to the discrete values.

To use the trend model to specify spatial continuity values for the blocks in the geologic model, two or more values for the trend-attributes must be specified, FIG. 2, step 215. These values are referred to as endmember-trend-attribute values. For discrete trend models, the endmember-trend-attribute values are identical to and are represented by all of the discrete trend-attribute values in the discrete model (for example, the discrete rock-facies values assigned in the geologic model). For continuous trend models, two or more endmember-trend-attribute values must be chosen so that the spatial continuity in the geologic model can be specified either by interpolation, for blocks having trend-attribute values falling within the range defined by the blocks which have specified endmember-trend-attribute values, or by extrapolation, for blocks having trend-attribute values located outside the various blocks which have specified endmember-trend-attribute values.

As an example, assume that spatial continuity of a modeled property along the Z-axis direction (vertical direction) varies as a function of vertical location within a modeled interval. Further assume that continuity is greatest at the base of the interval, less in the middle of the interval, and then increases again toward the top of the interval. In this example, the trend-attribute is the vertical location of the model block within the interval, as represented by the geologic-model layer number. The trend-attribute is assumed to vary in a continuous linear trend manner. Three endmember-trend-attribute values are identified, corresponding to the geologic-model layer numbers representing the base, middle, and top of the interval. The continuous linear trend model is used to interpolate spatial continuity into blocks located either between the base and the middle of the interval or between the middle and the top of the interval; in other words between neighboring endmember-trend-attribute values.

At each of the locations in the geologic model that are represented by endmember-trend-attribute values, one-dimensional local-amplitude spectra are computed, FIG. 2, step 216. These local-amplitude spectra represent, in the frequency domain, the spatial continuity of the modeled property at the locations in the geologic model corresponding to each of the endmember-trend-attribute values. The local-amplitude spectra must represent continuity in the same orientation as that specified for the global-amplitude spectrum, and will be referred to as endmember-local-amplitude spectra. These spectra can be generated, for example, by defining one-dimensional variogram models that represent spatial continuity at the locations of the endmember-trend-attribute values, and then Fourier transforming those variogram models into endmember-local-amplitude spectra.

Both the global-amplitude spectrum and each endmember-local-amplitude spectrum are discretized into multiple frequency bins, FIG. 2, step 217. The bins must be common to all spectra, and may contain one or more individual frequency values.

For each frequency bin of each of the endmember-local-amplitude spectra, a single endmember-local-amplitude-ratio value is calculated by dividing the amplitude value of the endmember-local-amplitude spectrum ($A_{endmember}$) by the amplitude value of the corresponding bin in the global-amplitude spectrum ($A_{global}$), FIG. 2, step 218. If multiple frequency values are represented in the frequency bin, the endmember-local-amplitude-ratio value can be calculated using any appropriate method. A preferred method is a mean square calculation, as follows:

$$\text{Endmember-Local-Amplitude-Ratio-Value} = SQRT[\Sigma(A_{endmember}(f)^2)/\Sigma(A_{global}(f)^2)]$$

where $A_{endmember}(f)$ represents the amplitude of the endmember-local-amplitude spectrum for the frequency range, $A(f)_{global}$ represents the amplitude of the global-amplitude spectrum for the same frequency range, and the summations are over all frequencies "f" in the frequency bin. At the completion of this step, one endmember-local-amplitude-ratio value per frequency bin has been calculated for each of the endmember-local-amplitude spectra.

Using the trend model from step 214 and the endmember-local-amplitude ratio values from step 218, each frequency bin at each block of the geologic model is assigned a local-amplitude-ratio value, FIG. 1, step 219. For trends defined by discrete trend models, the local-amplitude-ratio values are assigned to the blocks in the geologic model based on the trend model and the discrete attribute value assigned to the block. For trends defined by continuous trend models, the endmember-local-amplitude-ratio value for each bin is used along with the trend model to calculate a local-amplitude ratio value for each bin and each block. This calculation is by interpolation for blocks having trend-attribute values falling within the range defined by neighboring endmember-trend-attribute values, and extrapolation for blocks having trend-attribute values located outside the range defined by neighboring endmember-trend-attribute values.

As an example, assume that the trend-attribute is the model layer number and that two neighboring endmember-trend-attribute values correspond to layers 1 and 51. Further assume that the trend model is linear. In a first frequency bin of the endmember-local-amplitude-spectra, the local-amplitude ratio values are 0.3 at layer 1 and 0.5 at layer 51. At layer 26, the linear trend model would result, by interpolation, in an estimate of a local-amplitude-ratio value of 0.4 for this frequency bin. At layer 101, the linear trend model would result in an estimate, by extrapolation, of a local-amplitude-ratio value of 0.7 for this frequency bin.

Whether the trend model is continuous or discrete, FIG. 1, step 219 assigns one local-amplitude-ratio value per frequency bin to each block of the candidate geologic model.

To apply the local-amplitude-ratio values to the corresponding frequency bins of the candidate geologic model, that model must first be decomposed into multiple frequency components, one for each of the defined frequency bins. This decomposition can be accomplished, FIG. 2, step 220, for example by (a) Fourier transforming the candidate geologic model into its amplitude spectrum and phase spectrum (which together comprise the global spectrum of the candidate geologic model), (b) subdividing the amplitude and phase spectra into frequency bins that cover identical frequency ranges as the bins of the endmember-local-amplitude spectra, and, (c) inverse Fourier transforming the frequency content of each frequency bin into an individual space domain subcomponent of the model. This step results in the calculation of one local-frequency-component value per frequency bin for each block of the space domain geologic model. Note that substeps (a) and (b) of step 220 will have been previously performed in steps 212 and 217 for the amplitude spectrum of the global spectrum if the global-amplitude spectrum was derived from the candidate geologic model.

Next, scaled-frequency-components for each frequency bin are computed by multiplying the local-frequency-component value by the local-amplitude-ratio value, FIG. 2, step 221. This is performed for each block in the space domain geologic model.

All scaled-frequency-components for all bins are summed at each block in the space domain candidate geologic model, FIG. 1, step 222 to derive the space domain geologic model value that contains the imposed trend in rock-property spatial continuity. If it is desired to model additional trends in spatial continuity, then the process can be repeated, FIG. 2, step 223, using the derived space domain geologic model as the candidate geologic model in FIG. 2, step 211. Otherwise, the analysis is complete. For example, the analyst could choose to model a trend in spatial continuity for the same rock property that is in an orientation orthogonal to the spatial trend that was modeled in the first pass through the process of FIG. 2, in other words in one of the remaining two orthogonal orientations that define the three-dimensional array of blocks that comprise the geologic model. Alternatively, the analyst could choose to model a second trend in continuity in the same orientation for the same rock property by selecting a different trend-attribute; for example, the first pass might have trended the rock property according to model layer number, and the second pass might trend this same property according to burial depth or some other trend-attribute.

The result of the procedure of FIG. 2 is a geologic model having the desired local trend in spatial continuity.

Note that the embodiment of FIG. 2 can be used to generate a geologic model that honors multi-dimensional trends in spatial continuity. Preferably, such multi-dimensional trends are modeled in one orientation at a time, because one-dimensional modeling avoids the need to define a large number of multi-dimensional frequency bins, which in turn would entail generation of a large number of frequency components. For example, assume that the 3-D endmember-local-amplitude spectra are subdivided into 10 frequency bins in each of 3 orthogonal orientations. This results in $10^3$ 3-dimensional frequency bins to be manipulated by the computational routine. By modeling each orientation separately in sequential analyses, only 30 frequency bins would be generated, 10 in each orientation.

Though not a required element of this invention, to ensure that all desired criteria for the geologic model are honored, this embodiment could be integrated into an optimization procedure for constructing the geologic model. Many different optimization methods may be applicable, though a preferred embodiment is disclosed by Calvert, et al in U.S. patent application Ser. No. 09/934,320 titled "Method for Constructing 3-D Geologic Models by Combining Multiple Frequency Passbands."

An illustration of the application of the embodiment of the present invention outlined in FIG. 2 is depicted in the series of figures enumerated FIG. 3A through 3G. This illustration uses hypothetical assumptions in the various steps discussed above to generally demonstrate the procedures involved in this embodiment of the present invention.

In the illustration in FIG. 3, the trend in spatial continuity to be represented in the geologic model is thinning upward stratigraphic beds. Therefore, spatial continuity will be modeled in the Z-axis direction (vertical continuity) of the geologic model. FIG. 3A will be understood to those skilled in the art as describing an interbedded sand-shale sequence, and is further described hereafter for clarity. The initial geologic model involves a numerical modeled property indicative of sand/shale lithology, in this example shale volume. It will be understood that the individual stratigraphic beds of the geologic model depicted in FIG. 3A will be comprised generally of two types of beds, indicated in FIG. 3A by the sequences of beds numbered 300 and 301 respectively. More specifically, it will be understood that the beds indicated by single-line shading and by reference numbers 300A, 300B, 300C, and the like are sand or other potentially hydrocarbon-containing beds. These beds will be characterized by generally lower shale volume values. It will also be understood that beds 300 are separated by beds, indicated in cross-hatched shading and by reference numbers 301A, 301B, 301C, and the like, that are comprised for example of shales or other similar materials. These beds will be characterized by generally higher shale volume values. In this model it is desired that both beds 300 and beds 301 trend to thinner values toward the top 298 of the model. The trend-attribute that is to be used to characterize this trend is model layer number 297. For example, the model might be assumed to contain 100 layers, with layer number 1 assigned to the base 296 of the model and layer number 100 assigned to the top 298 of the model. In such a case, the two endmember-trend-attribute values that will be used are endmember-trend-attribute values for layer number 100 at the top 298 and layer number 1 at the base 296 of the model. It will be understood that the layers in a model are typically of constant thickness, so that relatively thicker beds are assigned a relatively larger number of layers than are assigned to the relatively thinner beds. This is for convenience, and is not a limitation of the present invention. For this illustration, we can assume the trend model to be continuous and linear, though this is not a required assumption of the present invention. The characteristics of the trend in spatial continuity depicted in FIG. 3A is assumed for the global model, and/or is based on global data which may be available. The present invention provides a method for modifying this global trend to take into account local nonstationarity of the geologic model, and to thereby incorporate predictable or measurable trends in rock properties into the model.

Next, a candidate geologic model is developed by assigning rock property values to each block within the model's space domain grid. In addition, a global variogram may be specified for the candidate geologic model. As noted, variograms quantify the spatial variability of the rock property of interest as a function of both separation distance and direction between any two points in the model. Both the model and the variogram may be developed using methods that will be understood to those skilled in the art. Because the illustration of FIG. 3 is not intended to depict the application of the present invention to a specific geologic subsurface region, neither the candidate geologic model nor the variogram are depicted in FIG. 3.

Figure 3A:
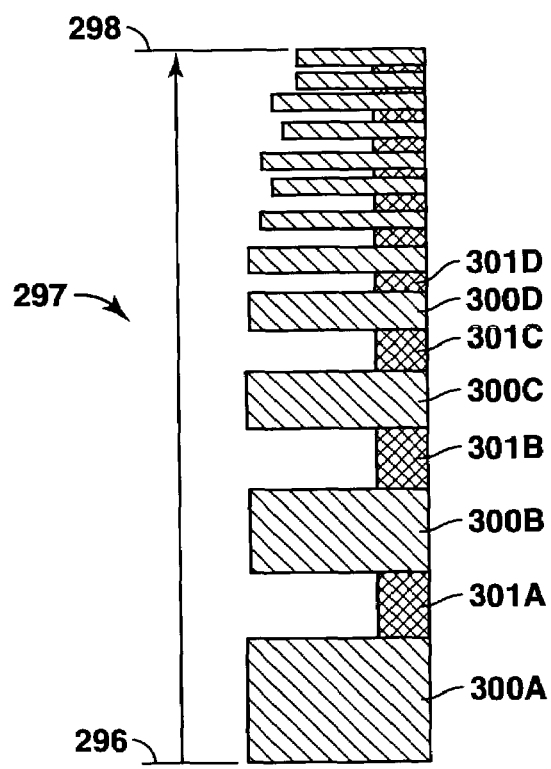
FIG. 3A depicts a continuous linear trend model for a thinning-upward sand/shale bed thickness model where the modeled property is shale volume and the trend attribute is model layer number.
Figure 3B:
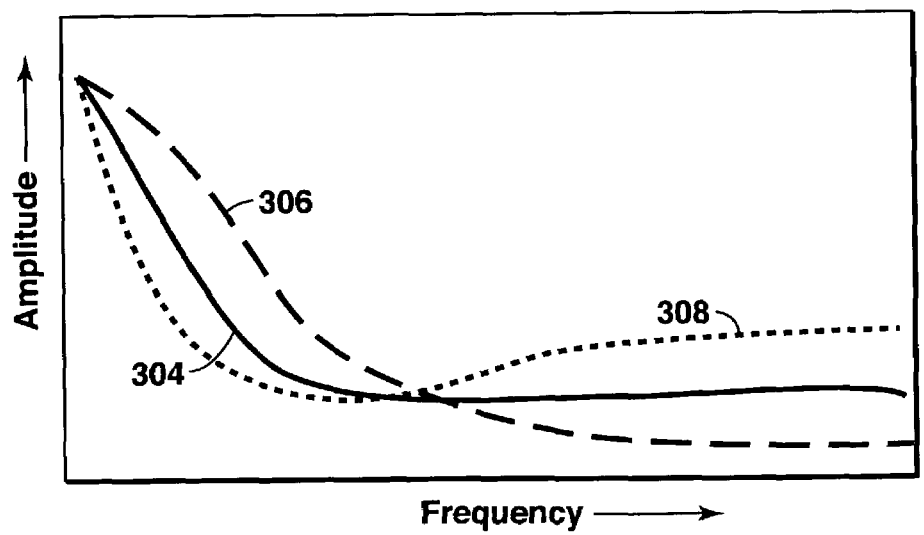
FIG. 3B depicts global and endmember-local-amplitude spectra for the vertical spatial continuity of shale volume depicted in the bed thickness model of FIG. 3A.

In the illustration of FIG. 3B, an assumed global-amplitude spectrum 304 that represents vertical continuity in the candidate geologic model is depicted as the solid line. As noted above, in an actual application of the present invention the global-amplitude spectrum will be derived from a Fourier transform of the candidate geologic model or the global variogram, or may be assumed based on other available data. FIG. 3B also shows the endmember-local-amplitude spectra, representing vertical continuity at the base 296 and at the top 298 of the model, which have also been assumed for this illustration. These endmember-local-amplitude spectra will typically be derived from 1-D variogram models that represent the continuity of the subject rock property at their corresponding locations in the candidate geologic model. It will be understood to those skilled in the art that the relatively thick beds at the base of the model will result in a local-amplitude spectrum that has relatively more energy in the low frequency portion of the spectrum than does the global-amplitude spectrum, as is indicated by endmember-local-amplitude spectrum 306 depicted as the long-dashed line in FIG. 3B. Similarly, it will be understood that the relatively thinner layers at the top of the model will result in a local-amplitude spectrum, as is indicated by endmember-local-amplitude spectrum 308 shown in FIG. 3B as the short-dashed line.

Figures 3C, 3D:
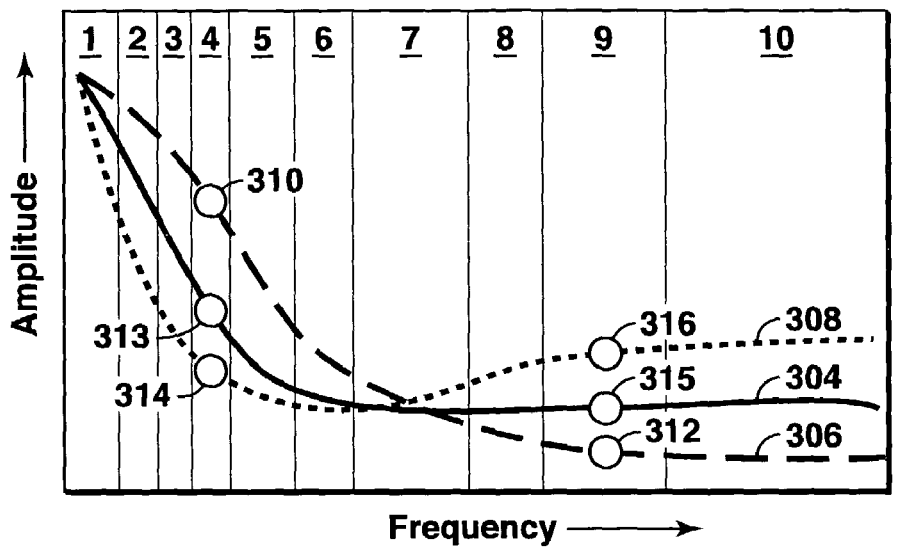
FIG. 3C depicts a ten frequency bin discretization of the spectra of FIG. 3B.
FIG. 3D depicts the endmember-local-amplitude-ratio values for bins 4 and 9 from FIG. 3C.

The global and the endmember-local-amplitude spectra are discretized into 10 frequency bins, as indicated in FIG. 3C. The range for each individual frequency bin may determined by the analyst. One method is to use an algorithm that can optimize the binning in a manner which minimizes the variance in amplitude ratio values over all frequency values within each frequency bin. Endmember-local-amplitude-ratio values for all frequency bins are calculated for both of the endmember-local-amplitude spectra. The endmember-local-amplitude-ratio for the base of the interval for frequency bin 4 is the ratio of the energy in the base endmember spectrum 306 in bin 4 to the energy in the global spectrum 304 in bin 4. In FIG. 3C, this is the ratio of the spectral value of point 310 to the spectral value of point 313. The endmember-local-amplitude-ratio for the top of the interval for frequency bin 4 is the ratio of the spectral value of point 314 to the spectral value of point 313. Analogous ratios are calculated to compute endmember-local-amplitude-ratios for all other bins. The values of the endmember-local-amplitude-ratios for only two frequency bins, bins 4 and 9, are presented in the table in FIG. 3D.

Figure 3E:
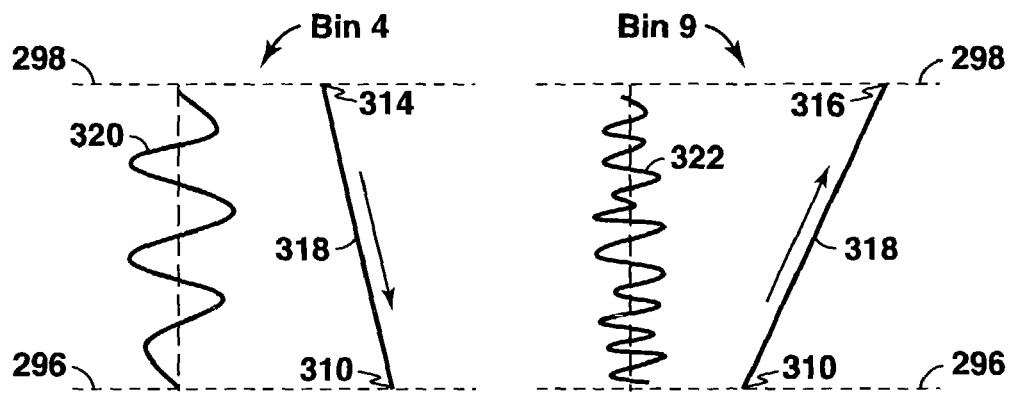
FIG. 3E depicts local-frequency-components for bins 4 and 9 of FIG. 3C from the top to the bottom of the model, and in addition depicts the variation in the local-amplitude ratio value for those bins from the top to the bottom of the model. Frequency components in FIG. 3E represent values of shale volume.

Next, local-frequency-components for the candidate geologic model must be calculated. As discussed above in conjunction with FIG. 2, this calculation involves (a) Fourier transforming the candidate geologic model into its amplitude and phase spectra, (b) subdividing the amplitude and phase spectra into frequency bins that are identical in frequency content to the bins of the endmember-local-amplitude-spectra, and, (c) inverse Fourier transforming the frequency content of each frequency bin into an individual space domain subcomponent of the model. In FIG. 3E local-frequency-components for frequency bins 4 and 9, 320 and 322 respectively, are depicted. Similar representations could be shown for the other eight frequency bins. Each subfigure also shows the linear trends in local-amplitude ratio values 318 for the respective frequency bins, with the corresponding endmember-local-amplitude-ratio values from FIG. 3D also indicated. The linear lines connecting these endmember-local-amplitude-ratio values are meant to represent the linear interpolation of the endmember-local-amplitude-ratio values 318 for the blocks having model layer numbers between the layers which correspond to the two endmember values (in other words, between the top 298 and base 296 of the model).

Figure 3F:
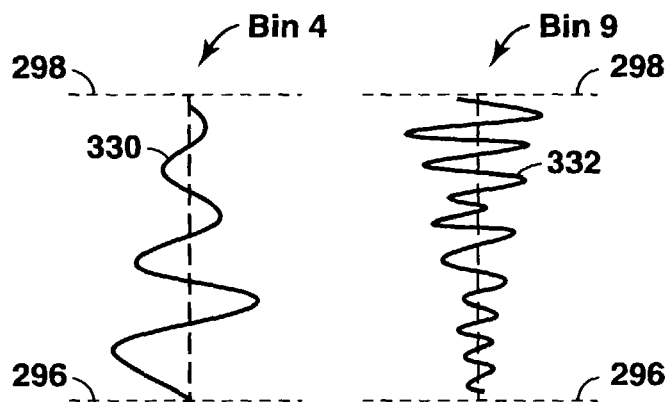
FIG. 3F depicts the scaled frequency components for bins 4 and 9 from the top to the bottom of the model that results from the data of FIG. 3E.

The local-frequency-components, 320 and 322 respectively, for bins 4 and 9 in FIG. 3E are scaled by multiplication by the corresponding local-amplitude-ratio values 318 for the bin and the block. The scaling multiplies the local-frequencycomponent in each subfigure of FIG. 3E by the corresponding local-amplitude ratio value in that subfigure. The result of this scaling is depicted in FIG. 3F. The scaled frequency components in FIG. 3F, 330 and 332 respectively, show that the local-amplitude-ratio for bin 4 emphasizes the amplitude of the bin's frequency component near the base of the model, and de-emphasizes the amplitude of the bin's frequency component near the top of the model. The reverse trend is indicated for bin 9 as a result of the different characteristics of the local-amplitude ratio values 318 for that bin.

Figure 3G:
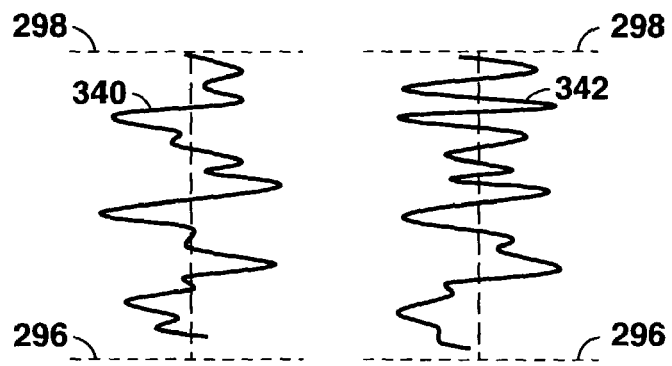
FIG. 3G demonstrates that the sum of the scaled frequency components of bins 4 and 9 from FIG. 3F incorporates the characteristics of thinner beds into the top of the model and thicker beds into the bottom of the model.

FIG. 3G illustrates the sum of the components of bins 4 and 9 from FIG. 3F, both before the present method has been applied, 340 in the left side of the figure, and after the present method has been applied, 342 in the right side of the figure. Although only two frequency bins have been summed for this figure, the illustration clearly indicates that the desired trend in spatial continuity, i.e., vertical continuity representing thinning-upward beds, has been achieved by applying the steps of this invention. More specifically, the sum of the scaled-frequency-components 342 has relatively more lower frequency content near base 296, and relatively more higher frequency content near top 298. The frequency content depicted in FIG. 3F provides an indication that the present method has incorporated the variation in frequency content that is characterized by the endmember-local-amplitude-spectra of FIG. 3B into the global model. By repeating this process for all bins and all blocks of the geologic model, a geologic model results that honors the desired trend in rock-property continuity.

Figure 4A:
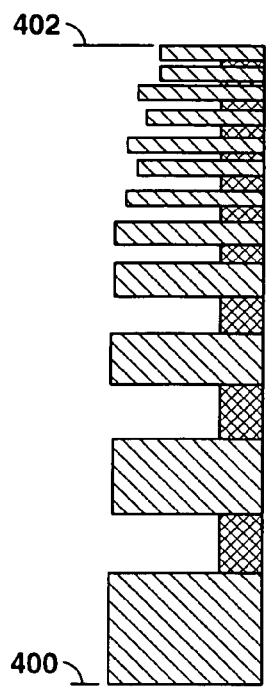
FIG. 4A depicts a continuous linear trend model for a thinning-upward sand/shale bed thickness model where the modeled property is shale volume and where the trend attribute is model layer number.

FIG. 4 illustrates the result of the application of the embodiment of the present invention outlined in FIG. 2. In this application, the modeling focused on a vertical spatial trend in shale volume continuity, as shown in FIG. 4A. The shale volume candidate geologic model (not depicted) was generated from synthetic data using geostatistical methods which will be understood to practitioners of geologic modeling. The model consisted of 100 layers. The global and local-amplitude spectra were derived from synthetic, 1-dimensional variogram models representing an orientation of spatial continuity in the Z-axis direction of the geologic model (vertical continuity). The endmember-local-amplitude spectra were assigned to blocks in the geologic model that represented the base and top layers 400 and 402 in the modeled interval (the endmember-trend-attribute values), in this case, layers 1 and 100. A continuous linear-trend model was assumed to assign local-amplitude-ratio values for each frequency bin to all blocks in the geologic model. The local-frequency-component values for each frequency bin were assigned to each block in the geologic model by decomposing the candidate geologic model into multiple frequency components, one component for each frequency bin.

Figure 4B:
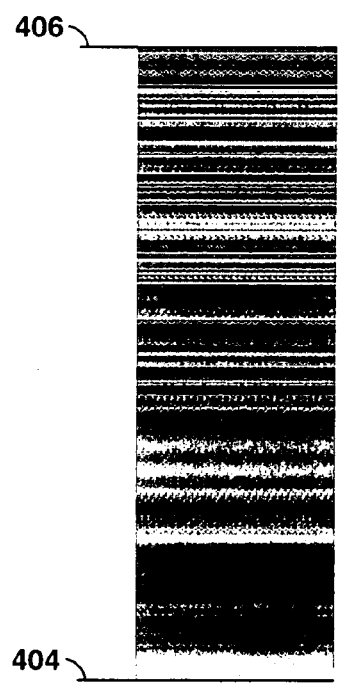
FIG. 4B demonstrates the thinning upward trend in shale volume that results from the application of the embodiment of FIG. 2 to the spatial trend of FIG. 4A.

The local-frequency-component values were multiplied by the local-amplitude-ratio values to generate scaled frequency components, which were then summed together resulting in a geologic model having the desired trend in spatial continuity. FIG. 4B depicts the trend in shale volume continuity in one column of blocks in the geologic model, in other words in all blocks having a fixed X and Y orientation, over all layers (Z orientation values) in the model. Notice that the trend in shale volume continuity represents thicker stratigraphic beds at the base 404 of the interval and trends to thinner beds at the top 406.

It should be understood that the preceding is merely a detailed description of specific embodiments of this invention. Other embodiments may be employed and numerous changes to the disclosed embodiments may be made in accordance with the disclosure herein without departing from the spirit or scope of the present invention. Furthermore, each of the above embodiments is within the scope of the present invention. The preceding description, therefore, is not meant to limit the scope of the invention. Rather, the scope of the invention is to be determined only by the appended claims and their equivalents.

We claim:

1. A computer-implemented method of generating a geologic model, comprising the steps of:
   (a) assigning a rock-property value, on a block-by-block basis, to each block of a space domain candidate geologic model having a three-dimensional array of blocks;
   (b) assigning, on a block-by-block basis, a local spectrum of said rock-property value to each of at least some of said blocks, each said local spectrum of said rock-property value incorporating a local spatial trend in rock property continuity for each respective block;
   (c) using said local spectra to frequency scale said rock-property value, on a block-by-block basis, at each of said blocks; and
   (d) using said scaled rock-property values to generate a scaled space domain geologic model incorporating said local spatial trend in rock property continuity.

2. The method of claim 1, wherein said frequency scaling involves the steps of:
   (a) computing a global-amplitude spectrum for said space domain candidate geologic model;
   (b) discretizing said global-amplitude spectrum and each said local spectrum into frequency bins; and
   (c) calculating, individually and locally, a local-amplitude-ratio for each said frequency bin and each said block, wherein each said local-amplitude-ratio represents the ratio of the local spectral energy in said frequency bin for said block to the global-amplitude spectral energy in said frequency bin for said block.

3. The method of claim 2, wherein said frequency scaling involves the step of scaling local-frequency-components of a global spectrum for said space domain candidate geologic model by said local-amplitude ratios.

4. The method of claim 3, wherein said local-frequency-components are generated by
   (i) calculating the frequency domain representation of the candidate geologic model,
   (ii) separating this representation into frequency bins, and
   (iii) individually transforming each frequency bin back to the space domain, wherein (i) is the only transformation of the geologic model's data into the frequency domain in said method.

5. The method of claim 4, wherein at each block said local-frequency-components are summed over all frequency bins to generate the value of said scaled space domain geologic model at said block.

6. The method of claim 2, wherein each said local-amplitude-ratio is calculated by a mean square calculation over all frequencies in each said bin.

7. A computer-implemented method of generating a geologic model, comprising the steps of:
   (a) assigning a rock-property value, on a block-by-block basis, to each block of a space domain candidate geologic model;
   (b) identifying a trend-attribute related to a trend in spatial continuity;
   (c) defining a trend model that characterizes said trend;
   (d) identifying at least two endmember-trend-attribute values for said trend model, (e) generating endmember-local spectra at each block in said model for which endmember-trend-attribute values have been identified;

(f) calculating endmember-local-amplitude-ratio values for each said endmember-local spectra;

(g) using said trend model and said endmember-local-amplitude-ratio values to frequency scale said rock-property values, on a block-by-block basis, at each of said blocks; and (h) using said scaled rock-property values to generate a scaled space domain geologic model incorporating said local spatial trend in rock property continuity.

8. The method of claim 7, wherein said frequency scaling involves the steps of:

(a) computing a global-amplitude spectrum for said space domain candidate geologic model;

(b) discretizing said global-amplitude spectrum and each said endmember-local spectrum into frequency bins, wherein said endmember-local-amplitude-ratios represents the ratio of the spectral energy in said frequency bin for each said endmember-local spectra to the global-amplitude spectral energy in said frequency bin for said block.

9. The method of claim 8, wherein each said endmember-local-amplitude-ratio is calculated by a mean square calculation over all frequencies in each said bin.

10. The method of claim 7, wherein said frequency scaling involves multiplication of local-amplitude ratio values for each frequency bin and each block by a local-frequency-component for said bin and said block.

11. The method of claim 10, wherein said local-amplitude-ratio values are calculated from said endmember-local-amplitude ratios using said trend model.

12. The method of claim 7, wherein said frequency scaling involves the step of computing local-frequency-components of a global spectrum for said space domain candidate geologic model.

13. The method of claim 12, wherein said local frequency components are computed by (i) calculating the frequency domain representation of the candidate geologic model using a Fast Fourier Transform, (ii) separating this representation into frequency bins, and (iii) transforming each frequency bin back to the space domain, wherein (i) is the only transformation of the geologic model's data into the frequency domain in said method.

14. The method of claim 1 wherein said rock property value is selected from the group comprising porosity, shale volume, net sand percent, net pore volume, hydrocarbon saturation, hydrocarbon pore volume, acoustic impedance, and permeability.

15. The method of claim 7 wherein said rock property value is selected from the group comprising porosity, shale volume, net sand percent, net pore volume, hydrocarbon saturation, hydrocarbon pore volume, acoustic impedance, and permeability.

16. The method of claim 1, wherein an optimization procedure is used to maximally honor both characteristics of said space domain candidate geologic model and characteristics of each said local spectrum.

17. The method of claim 7, wherein an optimization procedure is used to maximally honor both characteristics of said space domain candidate geologic model and characteristics of each said local spectrum.

18. A computer-implemented method of incorporating a spatial trend in rock property continuity into a geologic model, comprising the steps of:

(a) generating a space domain candidate geologic model for a rock property;

(b) specifying a global-amplitude spectrum for said space domain candidate geologic model;

(c) specifying a local-amplitude spectrum for each block in said space domain candidate geologic model, wherein each said local-amplitude spectrum incorporates, on a block-by-block basis, a desired spatial trend in rock property;

(d) discretizing said global-amplitude spectrum and said local-amplitude spectrum;

(e) computing local-amplitude ratios for each said block and each said frequency bin using said global-amplitude spectrum and said local-amplitude spectrum;

(f) computing local-frequency-components for each said frequency bin and each said block using a global spectrum of said model;

(g) generating scaled-local-frequency-components for each said frequency bin and each said block by multiplying said local-amplitude-ratio values of each said frequency bin for each said block by the local-frequency-component corresponding to said frequency and said block; and (h) summing all scaled-local-frequency-components for each said block to generate a space domain representation of said space domain geologic model at each said block which incorporates said desired spatial trend.

19. A computer-implemented method of incorporating a spatial trend in rock property continuity into a geologic model, comprising the steps of:

(a) generating a space domain candidate geologic model for said rock property;

(b) specifying a global-amplitude spectrum for said space domain candidate geologic model;

(c) identifying one or more attributes that correlate with said spatial trend;

(d) defining a trend model that defines said spatial trend;

(e) identifying end-member-trend-attribute values for said trend model;

(f) specifying endmember-local-amplitude spectra, on a block-by-block basis, for each block in said space domain candidate geologic model corresponding to said endmember-trend-amplitude values;

(g) discretizing said global-amplitude and said endmember-local-amplitude spectra into frequency bins;

(h) calculating endmember-local-amplitude ratios for each said bin and each said endmember- local-amplitude spectra;

(i) assigning a local-amplitude-ratio value to each said bin of each said block;

(j) computing and discretizing into frequency bins a global spectrum of said space domain candidate geologic model;

(k) computing local-frequency-components for each said bin and each said block of said space domain candidate geologic model;

(l) computing scaled-local-frequency-components by multiplying said local-amplitude-ratio values of each said frequency bin for each said block by said local-frequency-component corresponding to said frequency and said block; and (m) summing all scaled-local-frequency-components for each said block to generate a space domain representation of said space domain geologic model at each said block which incorporates said desired spatial trend.

20. The method of claim 1, wherein assigning the local spectrum of said rock-property value to each of at least some of said blocks comprises:
   generating a plurality of variogram models each representing a different estimate of spatial variability in the modeled rock property; and
   assigning one of the variogram models, on a block-by-block basis, to each block, wherein the assigned variogram model represents a desired local estimate of continuity of the modeled rock property at that block.

21. The method of claim 20, further comprising transforming, on a block-by-block basis, the assigned variogram models for each block to the frequency domain.

22. The method of claim 14, wherein said rock property value is selected from the group comprising porosity, shale volume, and net sand percent.

23. The method of claim 15, wherein said rock property value is selected from the group comprising porosity, shale volume, and net sand percent.

24. The method of claim 1, further comprising performing steps (a)-(d) for a second rock-property value simultaneously with the rock-property value of claim 1, the rock-property value of claim 1 and the second rock-property value being discrete rock properties each chosen from the group comprising porosity, shale volume, net sand percent, net pore volume, hydrocarbon saturation, hydrocarbon pore volume, acoustic impedance, and permeability.

* * * * *